United States Patent
Bradley

(10) Patent No.: US 10,725,164 B1
(45) Date of Patent: Jul. 28, 2020

(54) SYSTEM AND METHOD FOR DETECTING VEHICLES AND STRUCTURES INCLUDING STEALTH AIRCRAFT

(71) Applicant: ANRITSU COMPANY, Morgan Hill, CA (US)

(72) Inventor: Donald Anthony Bradley, Morgan Hill, CA (US)

(73) Assignee: ANRITSU COMPANY, Morgan Hill, CA (US)

( * ) Notice: Subject to any disclaimer, the term of this patent is extended or adjusted under 35 U.S.C. 154(b) by 394 days.

(21) Appl. No.: 15/488,302

(22) Filed: Apr. 14, 2017

(51) Int. Cl.
| | |
|---|---|
| *G01S 13/30* | (2006.01) |
| *G01S 13/10* | (2006.01) |
| *G01S 7/35* | (2006.01) |
| *G01S 13/04* | (2006.01) |
| *G01S 7/41* | (2006.01) |

(52) U.S. Cl.
CPC ............ *G01S 13/30* (2013.01); *G01S 13/103* (2013.01); *G01S 13/106* (2013.01); *G01S 7/354* (2013.01); *G01S 7/414* (2013.01); *G01S 13/04* (2013.01)

(58) Field of Classification Search
CPC ........ G01S 7/354; G01S 13/04; G01S 13/931; G01S 13/34; G01S 7/032; G01S 13/87; G01S 7/414; G01S 13/106; G01S 7/282; G01S 7/285; G01S 7/41; G01S 7/352; G01S 7/4008; G01S 7/527
See application file for complete search history.

(56) References Cited

U.S. PATENT DOCUMENTS

| | | |
|---|---|---|
| 5,801,525 A | 9/1998 | Oldfield |
| 5,812,039 A | 9/1998 | Oldfield |
| 5,909,192 A | 6/1999 | Finch |
| 5,977,779 A | 11/1999 | Bradley |
| 6,049,212 A | 4/2000 | Oldfield |
| 6,291,984 B1 | 9/2001 | Wong |
| 6,316,945 B1 | 11/2001 | Kapetanic |
| 6,331,769 B1 | 12/2001 | Wong |
| 6,496,353 B1 | 12/2002 | Chio |
| 6,504,449 B2 | 1/2003 | Constantine |
| 6,509,821 B2 | 1/2003 | Oldfield |
| 6,525,631 B1 | 2/2003 | Oldfield |
| 6,529,844 B1 | 3/2003 | Kapetanic |

(Continued)

OTHER PUBLICATIONS

Akmal, M. et al., "An Enhanced Modulated Waveform Measurement System for the Robust Characterization of Microwave Devices under Modulated Excitation", Proceedings of the 6th European Microwave Integrated Circuits Conference, © 2011, Oct. 2011, Manchester, UK, pp. 180-183.

(Continued)

*Primary Examiner* — Olumide Ajibade Akonai
(74) *Attorney, Agent, or Firm* — Tucker Ellis LLP

(57) ABSTRACT

A method for detecting objects comprising radiation-absorbent material includes transmitting signals of two different frequencies to a target location and receiving an intermodulation product from the target location. The signals are transmitted via separate antennas connected with respective transmitters. The intermodulation product is received by a receiving antenna connected with a receiver and arranged to receive the intermodulation product reradiated from the target location. The intermodulation product comprises a harmonic of the two signals.

13 Claims, 4 Drawing Sheets

(56) References Cited

U.S. PATENT DOCUMENTS

| | | |
|---|---|---|
| 6,548,999 B2 | 4/2003 | Wong |
| 6,650,123 B2 | 11/2003 | Martens |
| 6,665,628 B2 | 12/2003 | Martens |
| 6,670,796 B2 | 12/2003 | Mori |
| 6,680,679 B2 | 1/2004 | Stickle |
| 6,700,366 B2 | 3/2004 | Truesdale |
| 6,700,531 B2 | 3/2004 | Abou-Jaoude |
| 6,714,898 B1 | 3/2004 | Kapetanic |
| 6,766,262 B2 | 7/2004 | Martens |
| 6,832,170 B2 | 12/2004 | Martens |
| 6,839,030 B2 | 1/2005 | Noujeim |
| 6,882,160 B2 | 4/2005 | Martens |
| 6,888,342 B2 | 5/2005 | Bradley |
| 6,894,581 B2 | 5/2005 | Noujeim |
| 6,917,892 B2 | 7/2005 | Bradley |
| 6,928,373 B2 | 8/2005 | Martens |
| 6,943,563 B2 | 9/2005 | Martens |
| 7,002,517 B2 | 2/2006 | Noujeim |
| 7,011,529 B2 | 3/2006 | Oldfield |
| 7,016,024 B2 | 3/2006 | Bridge |
| 7,019,510 B1 | 3/2006 | Bradley |
| 7,054,776 B2 | 5/2006 | Bradley |
| 7,068,046 B2 | 6/2006 | Martens |
| 7,088,111 B2 | 8/2006 | Noujeim |
| 7,108,527 B2 | 9/2006 | Oldfield |
| 7,126,347 B1 | 10/2006 | Bradley |
| 7,284,141 B2 | 10/2007 | Stickle |
| 7,304,469 B1 | 12/2007 | Bradley |
| 7,307,493 B2 | 12/2007 | Feldman |
| 7,509,107 B2 | 3/2009 | Bradley |
| 7,511,496 B2 | 3/2009 | Schiano |
| 7,511,577 B2 | 3/2009 | Bradley |
| 7,521,939 B2 | 4/2009 | Bradley |
| 7,545,151 B2 | 6/2009 | Martens |
| 7,683,602 B2 | 3/2010 | Bradley |
| 7,683,633 B2 | 3/2010 | Noujeim |
| 7,705,582 B2 | 4/2010 | Noujeim |
| 7,746,052 B2 | 6/2010 | Noujeim |
| 7,764,141 B2 | 7/2010 | Noujeim |
| 7,872,467 B2 | 1/2011 | Bradley |
| 7,924,024 B2 | 4/2011 | Martens |
| 7,957,462 B2 | 6/2011 | Aboujaoude |
| 7,983,668 B2 | 7/2011 | Tiernan |
| 8,027,390 B2 | 9/2011 | Noujeim |
| 8,058,880 B2 | 11/2011 | Bradley |
| 8,145,166 B2 | 3/2012 | Barber |
| 8,156,167 B2 | 4/2012 | Bradley |
| 8,159,208 B2 | 4/2012 | Brown |
| 8,169,993 B2 | 5/2012 | Huang |
| 8,185,078 B2 | 5/2012 | Martens |
| 8,278,944 B1 | 10/2012 | Noujeim |
| 8,294,469 B2 | 10/2012 | Bradley |
| 8,305,115 B2 | 11/2012 | Bradley |
| 8,306,134 B2 | 11/2012 | Martens |
| 8,410,786 B1 | 4/2013 | Bradley |
| 8,417,189 B2 | 4/2013 | Noujeim |
| 8,457,187 B1 | 6/2013 | Aboujaoude |
| 8,493,111 B1 | 7/2013 | Bradley |
| 8,498,582 B1 | 7/2013 | Bradley |
| 8,593,158 B1 | 11/2013 | Bradley |
| 8,629,671 B1 | 1/2014 | Bradley |
| 8,630,591 B1 | 1/2014 | Martens |
| 8,666,322 B1 | 3/2014 | Bradley |
| 8,718,586 B2 | 5/2014 | Martens |
| 8,760,148 B1 | 6/2014 | Bradley |
| 8,816,672 B1 | 8/2014 | Bradley |
| 8,816,673 B1 | 8/2014 | Barber |
| 8,884,664 B1 | 11/2014 | Bradley |
| 8,903,149 B1 | 12/2014 | Noujeim |
| 8,903,324 B1 | 12/2014 | Bradley |
| 8,942,109 B2 | 1/2015 | Dorenbosch |
| 9,103,856 B2 | 8/2015 | Brown |
| 9,103,873 B1 | 8/2015 | Martens |
| 9,176,174 B1 | 11/2015 | Bradley |
| 9,176,180 B1 | 11/2015 | Bradley |
| 9,210,598 B1 | 12/2015 | Bradley |
| 9,239,371 B1 | 1/2016 | Bradley |
| 9,287,604 B1 | 3/2016 | Noujeim |
| 9,331,633 B1 | 5/2016 | Robertson |
| 9,366,707 B1 | 6/2016 | Bradley |
| 9,455,792 B1 | 9/2016 | Truesdale |
| 9,560,537 B1 | 1/2017 | Lundquist |
| 9,571,142 B2 | 2/2017 | Huang |
| 9,588,212 B1 | 3/2017 | Bradley |
| 9,594,370 B1 | 3/2017 | Bradley |
| 9,606,212 B1 | 3/2017 | Martens |
| 9,696,403 B1 | 7/2017 | Elder-Groebe |
| 9,733,289 B1 | 8/2017 | Bradley |
| 9,753,071 B1 | 9/2017 | Martens |
| 9,768,892 B1 | 9/2017 | Bradley |
| 9,860,054 B1 | 1/2018 | Bradley |
| 9,964,585 B1 | 5/2018 | Bradley |
| 9,967,085 B1 | 5/2018 | Bradley |
| 9,977,068 B1 | 5/2018 | Bradley |
| 10,003,453 B1 | 6/2018 | Bradley |
| 10,006,952 B1 | 6/2018 | Bradley |
| 10,064,317 B1 | 8/2018 | Bradley |
| 10,116,432 B1 | 10/2018 | Bradley |
| 2006/0250135 A1 | 11/2006 | Buchwald |
| 2009/0051581 A1* | 2/2009 | Hatono ............... G01S 7/285 342/33 |
| 2011/0037667 A1 | 2/2011 | Varjonen |
| 2012/0256783 A1* | 10/2012 | Sego ................ G01S 13/106 342/146 |
| 2015/0253415 A1* | 9/2015 | Mazzaro ............ G01S 7/02 342/27 |
| 2016/0050032 A1 | 2/2016 | Emerson |
| 2016/0282457 A1* | 9/2016 | Mazzaro ............. G01S 13/106 |
| 2017/0307726 A1* | 10/2017 | Mazzaro ............. G01S 7/414 |

OTHER PUBLICATIONS

Cunha, Telmo R. et al., "Characterizing Power Amplifier Static AM/PM with Spectrum Analyzer Measurements", IEEE © 2014, 4 pages.

Fager, Christian et al., "Prediction of Smart Antenna Transmitter Characteristics Using a New Behavioral Modeling Approach" IEEE® 2014, 4 pages.

Fager, Christian et al., "Analysis of Nonlinear Distortion in Phased Array Transmitters" 2017 International Workshop on Integrated Nonlinear Microwave and Millmetre-Wave Circuits (INMMiC), Apr. 20-21, 2017, Graz, Austria, 4 pages.

Martens, J. et al., "Towards Faster, Swept, Time-Coherent Transient Network Analyzer Measurements" 86th ARFTG Conf. Dig., Dec. 2015, 4 pages.

Martens, J., "Match correction and linearity effects on wide-bandwidth modulated AM-AM and AM-PM measurements" 2016 EuMW Conf. Dig., Oct. 2016, 4 pages.

Nopchinda, Dhecha et al., "Emulation of Array Coupling Influence on RF Power Amplifiers in a Measurement Setup", IEEE © 2016, 4 pages.

Pedro, Jose Carlos et al., "On the Use of Multitone Techniques for Assessing RF Components' Intermodulation Distortion", IEEE Transactions on Microwave Theory and Techniques, vol. 47, No. 12, Dec. 1999, pp. 2393-2402.

Ribeiro, Diogo C. et al., "D-Parameters: A Novel Framework for Characterization and Behavorial Modeling of Mixed-Signal Systems", IEEE Transactions on Microwave Theory and Techniques, vol. 63, No. 10, Oct. 2015, pp. 3277-3287.

Roblin, Patrick, "Nonlinear RF Circuits and Nonlinear Vector Network Analyzers; Interactive Measurement and Design Techniques", The Cambridge RF and Microwave Engineering Series, Cambridge University Press © 2011, entire book.

Rusek, Fredrik et al., "Scaling Up MIMO; Opportunities and challenges with very large arrays", IEEE Signal Processing Magazine, Jan. 2013, pp. 40-60.

Senic, Damir et al., "Estimating and Reducing Uncertainty in Reverberation-Chamber Characterization at Millimeter-Wave Frequencies", IEEE Transactions on Antennas and Propagation, vol. 64, No. 7, Jul. 2016, pp. 3130-3140.

(56) References Cited

OTHER PUBLICATIONS

Senic, Damir et al., "Radiated Power Based on Wave Parameters at Millimeter-wave Frequencies for Integrated Wireless Devices", IEEE © 2016, 4 pages.

\* cited by examiner

SYSTEM AND METHOD FOR DETECTING VEHICLES AND STRUCTURES INCLUDING STEALTH AIRCRAFT

TECHNICAL FIELD

The present invention relates generally to systems and methods for detecting radiation-absorbent materials and vehicle and structures comprising radiation-absorbent materials.

BACKGROUND

Radiation-absorbent materials are a class of materials used in stealth technology and included coatings to disguise vehicles or structures from radar detection. A radiation-absorbent material is a material that has been specially designed and shaped to absorb incident radiation from a ground or air based radar station into the coating and convert it to heat rather than reflect the radiation back for detection by the radar station. The absorbency of a material at a given frequency of radio wave depends upon the composition of the material, and a given composition will have greater absorbency at some frequencies than others. While radiation-absorbent material cannot perfectly absorb radio waves at any frequency, a radiation-absorbent material applied to an object can significantly reduce the radar cross-section of the object in specific frequencies.

SUMMARY

In accordance with an embodiment, a system for detecting objects comprising radiation-absorbent material includes a pair of transmitters configured to transmit signals of two different frequencies via separate transmitting antennas. In accordance with some embodiments, the transmitters are configured to transmit synchronized pulses. The system also includes a receiver connectable to one of the antennas or a separate receiving antenna.

The transmitting antennas are arrangeable to transmit the two signals to a target location and the antenna connected to the receiver is arrangeable to receive an intermodulation product reradiated from the target location in response to the two transmitted signals. The receiver is configured to receive an intermodulation product of the two tones having a frequency comprising a harmonic of the two signals and to indicate detection of an object in response to receiving the intermodulation product.

The receiver can be configured to determine a distance to the object based on the time pulses for the two signals generated by the transmitters are transmitted by the antennas and the time of receipt of the received intermodulation product. The receiver can determine a distance to the object based on a downconverting signal generated from one of the two tones.

In accordance with an embodiment, a method for detecting objects comprising radiation-absorbent material includes transmitting signals of two different frequencies to a target location and receiving an intermodulation product from the target location. In accordance with some embodiments, the transmitters are configured to transmit synchronized pulses.

The signals are transmittable via separate antennas connected with respective transmitters. The intermodulation product is received by a receiving antenna connectable with a receiver and arranged to receive the intermodulation product reradiated from the target location. The intermodulation product comprises a harmonic of the two signals.

A distance to the object can be determined based on the time pulses for the two signals generated by the transmitters are transmitted by the antennas and the time of receipt of the received intermodulation product. The receiver can determine a distance to the object based on a downconverting signal generated from one of the two tones.

BRIEF DESCRIPTION OF THE DRAWINGS

Further details of the present invention are explained with the help of the attached drawings in which.

DETAILED DESCRIPTION

The following description is of the best modes presently contemplated for practicing various embodiments of the present invention. The description is not to be taken in a limiting sense but is made merely for the purpose of describing the general principles of the invention. The scope of the invention should be ascertained with reference to the claims. In the description of the invention that follows, like numerals or reference designators will be used to refer to like parts or elements throughout.

In the following description, numerous specific details are set forth to provide a thorough description of the invention. However, it will be apparent to those skilled in the art that the invention may be practiced without these specific details. In other instances, well-known features have not been described in detail so as not to obscure the invention.

Figure 1:
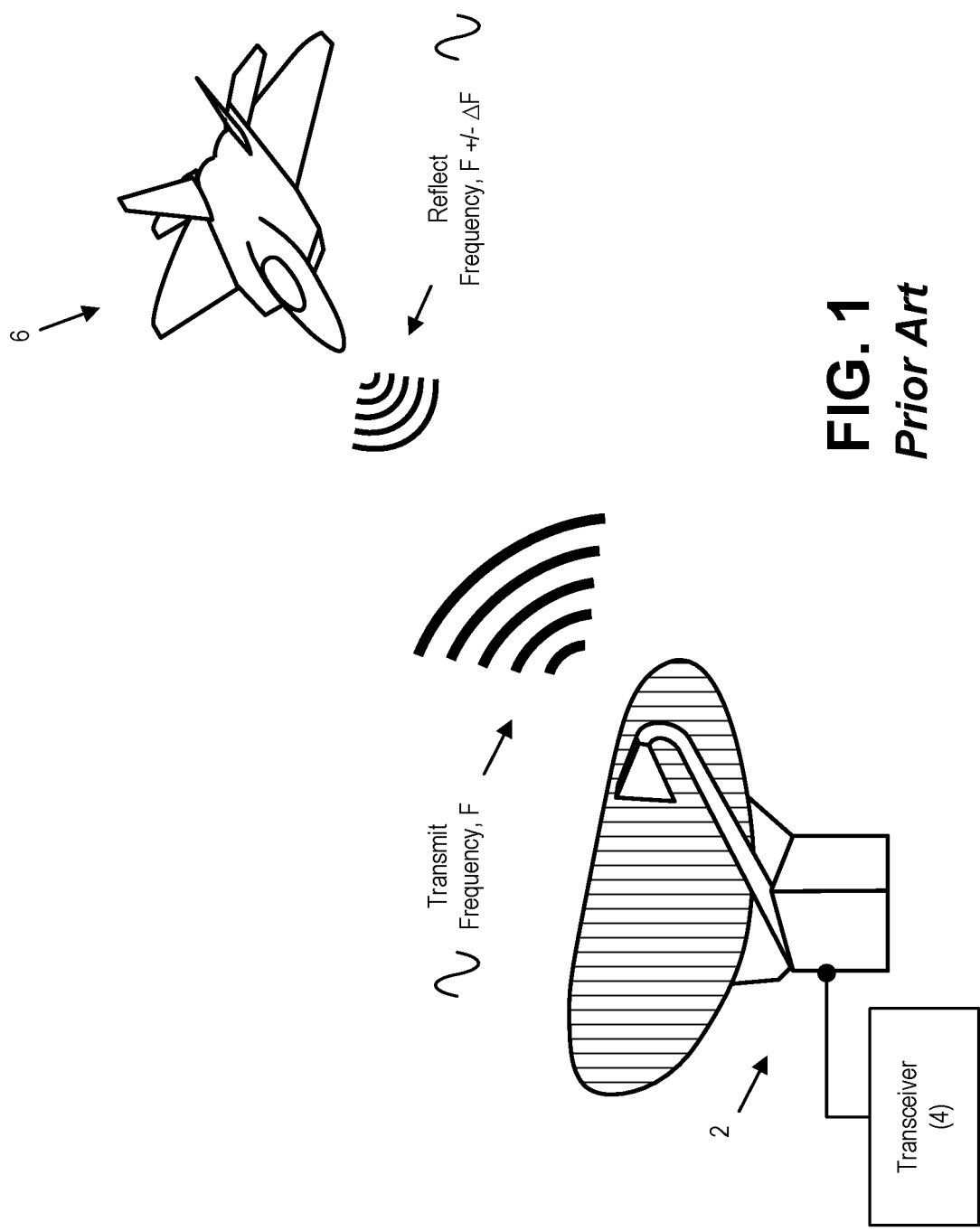
FIG. 1 is a radar system for detecting objects.

FIG. 1 illustrates a radar system for detecting vehicles, in accordance with the prior art. A radar system includes a transceiver 4 that generates radio waves and emits the radio waves via a transmitting antenna 2 at a transmit frequency F. When these radio waves come into contact with an object 6 they are usually reflected or scattered in many directions. The transmitting antenna is then used as a receiving antenna, and the radar signals that are reflected back towards the receiving antenna are detected by the transceiver and used for identifying the presence of an object. The radar cross-section of the object can roughly indicate the size of the object, and the distance to the object can be determined based on time-of-flight of the transmitted signal or using frequency modulation. A shift in frequency by ΔF results from movement of an object either toward or away from the transmitter, which causes a change in the frequency of the radio waves as a result of the Doppler Effect.

Radar systems can comprise transceivers and common antennas for transmit and receive, as describe, or can comprise transmitter-receivers and can include separate antennas for transmit and receive. Radar receivers are usually, but not always, arranged in the same location as the transmitter, whether integrated in a transceiver or separate. Reflected radar signals captured by the receiving antenna are typically weak and must be strengthened by electronic amplifiers. Use of radiation-absorbent materials on an object, in particular to implement stealth technology to hide the presence of the object, further weakens any reflected radar signal and can significantly reduce the radar cross-section of the object.

Detection of vehicles or structures comprising radiation-absorbent materials using radio wave-based technology, in particular detection of stealth aircraft and watercraft using radio wave transmitters and receivers, can be useful for defending against possible threats or preventing clandestine information gathering. Unfortunately, radiation-absorbent materials by their nature are designed to absorb radio waves and convert them to heat, rather than reflect the radio waves back for detection by a receiver.

It has been observed by the inventor that many materials designed to absorb radio frequency (RF) signals also generate and emit passive intermodulation products under certain conditions. Passive intermodulation (PIM) is the generation of unwanted signals by the non-linear mixing of two or more frequencies in a passive device, such as a connector or cable, that normally behaves linearly but when subjected to high RF power tones behaves nonlinearly. PIM can also result from the reradiation of emitted signals, for example from antennas that are outside of, and unrelated to, a device or system under test. PIM can be created when two signals from different systems or the same system combine and are then reradiated by a PIM source. Because PIM is problematic for telecommunication (telecom) networks, among other applications, measuring instruments have been developed to stimulate the generation of PIM at PIM sources and measure resulting PIM signals.

For measuring instruments used in telecom, a dummy load (hereinafter "load") is used to substitute for an antenna or other electrical load, for example for the purpose of calibrating the measuring instrument. The load is typically a resistor having a designed resistance that matches the impedance of an antenna or transmission line (e.g., 50 ohms). The radio energy that is transmitted by a measuring instrument is absorbed by the load and converted to heat. Standard loads for use with measuring instruments such as vector network analyzers (VNAs) comprise carbon, which is a common component of radiation-absorbent materials. While such loads are very effective for absorbing RF energy, they are also very non-linear and generate large PIM signals in response to RF signals that comprise two or more different frequency components.

PIM measuring instruments must be calibrated to measure and eliminate PIM generated internal to the measuring instrument. However, traditionally constructed loads are not usable for calibrating PIM measuring instruments as the PIM generated by the load overwhelms the measuring instrument.

Systems and methods in accordance with embodiments of the present invention can be applied to detect the presence of vehicles and structures comprising radiation-absorbent material, and in some embodiments, determine the distance to vehicles and structures comprising radiation-absorbent material. Such embodiments can rely on the properties of many radiation-absorbent materials to produce PIM and on receivers used in measuring instruments designed to measure PIM.

Instruments for Measuring PIM

Figure 2:
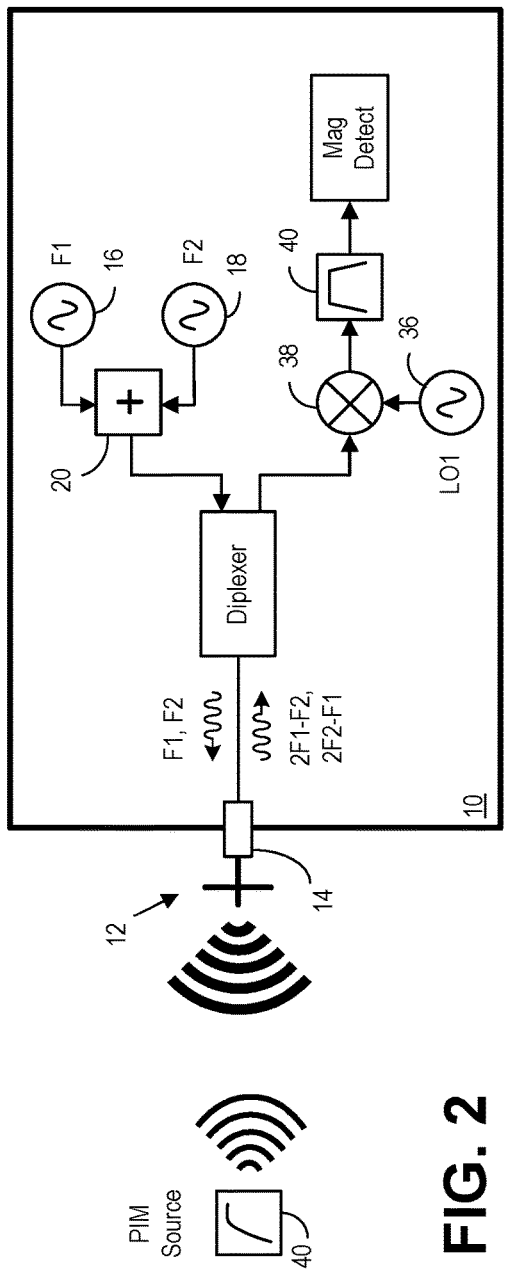
FIG. 2 is a simplified block diagram of a measuring instrument for measuring passive intermodulation (PIM), in accordance with the prior art.

To better explain some principles of operation of embodiments of the present invention, an explanation of measuring instruments for measuring PIM is provided herein. FIG. 2 is a block diagram of an exemplary measuring instrument 10 usable with an antenna 12 for measuring PIM generated by a PIM source 40 using frequency modulated, continuous wave or pulsed signals. The measuring instrument resembles measuring instruments described, for example, in U.S. Pat. No. 8,058,880 entitled "CALIBRATED TWO PORT PASSIVE INTERMODULATION (PIM) DISTANCE TO FAULT ANALYZER" issued to Bradley, et al. and incorporated herein by reference, and is merely exemplary.

The measuring instrument utilizes two signal sources, with a first signal source 16 producing a signal at frequency F1 and a second signal source 18 producing a signal at frequency F2. The signals are provided to a combiner 20 to create a combined test signal with frequency components F1 and F2 at the combiner output. A diplexer passes the test signal to a test port 14 connected with the antenna, which transmits the test signal. When the test signal is transmitted to the PIM source, unwanted PIM signals comprising harmonics of the test signal are generated and can be reflected back to the antenna.

The third order response of the reflected signal is of particular interest as it includes signals of higher power relative to other harmonics. For the test signal having components F1 and F2, the third order response occurs at frequencies $2F1-F2$ and $2F2-F1$. PIM signals reflected back and received at the antenna include these third order signals, one or both of which can be filtered and forwarded to be downconverted to an intermediate frequency (IF) for processing. The reflected signal is downconverted in one or more stages each including a mixer 38 at which the reflected signal is applied along with a LO signal generated by a local oscillator (LO) 36. The target frequency or frequencies are selected by filtering the mixer output using a low-pass filter 40. As shown, the reflected signal is downconverted to a target intermediate frequency in a single stage, although in other embodiments the reflected signal can be downconverted by a single stage or additional stages. The magnitude of the IF signal is measured by a receiver.

Figure 3:
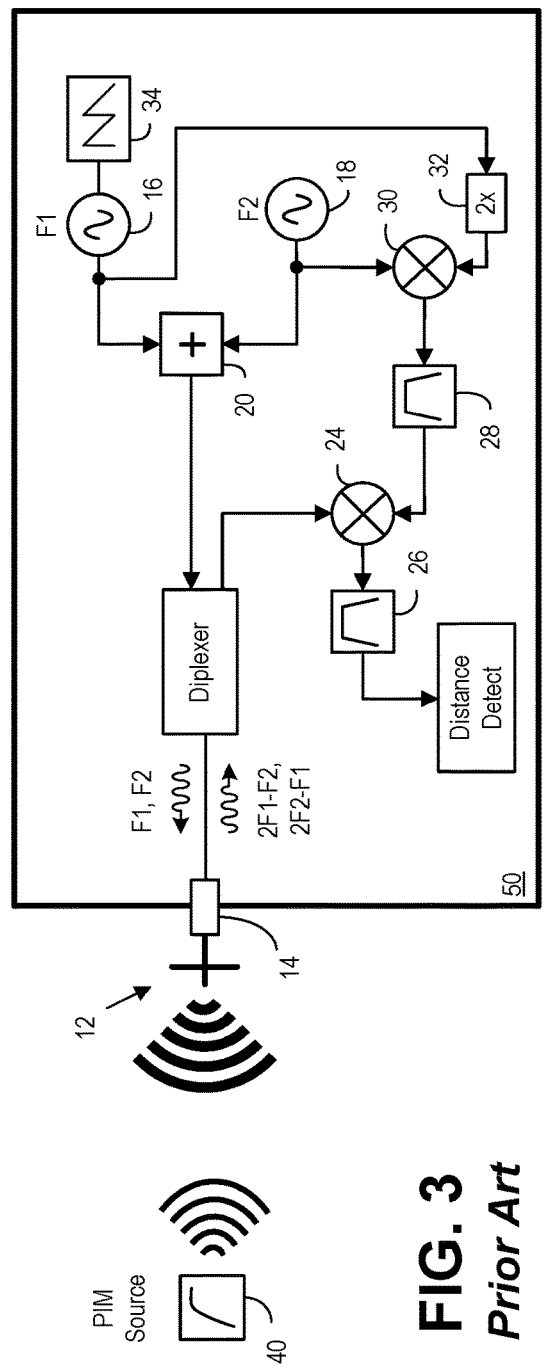
FIG. 3 is a simplified block diagram of a measuring instrument for determining a distance to a source of PIM, in accordance with the prior art.

FIG. 3 is a block diagram of an alternative exemplary measuring instrument 50 further usable for determining a distance to the PIM source. A frequency modulated (FM) sweep can be introduced using a sweep generator 34 connected to the first signal source. The frequency modulated sweep signal F1 and the fixed signal F2, when modified by the PIM source, will produce the additional signals $2(F1+FM)-F2$ and $2F2-(F1+FM)$. The delayed-in-time (distance) signal $2(F1+FM)-F2$ can be mixed with an internally generated, non-delayed signal $2(F1+FM)-F2$ to produce the desired measurement signal $\Delta F$. A distance-to-fault from the antenna can be determined based on $\Delta F$.

To provide a signal source for downconversion, a 2× frequency multiplier 32 connected to the first signal source provides a swept output to a first input of a mixer 30. A second input of the mixer is provided by the second signal source to generate the non-delayed signal. A bandpass filter 28 eliminates undesired mixing products from the mixer to provide a first input to a downconverting mixer 24. A second input of the downconverting mixer is provided from a diplexer that filters the reflected signal from the PIM source. The output of the downconverting mixer leaves substantially only the frequency deviation $\Delta F$ due to reflection of a test signal created by the PIM source. A low-pass filter 26 removes undesired mixing products, leaving only a forward trace sweep $\Delta F$ and retrace sweep signal 45 MHz–$\Delta F$. Measurement of $\Delta F$ with a digital receiver using Fourier transform to time domain or a spectrum analyzer gives a measurement of total distance of the test port to the PIM source, with post processing to account for the both the forward sweep $\Delta F$ and retrace 45 MHz–$\Delta F$.

The measuring instruments of FIGS. 2 and 3 are merely exemplary, and measuring instruments for measuring PIM magnitude can include different and/or additional components, and other configurations can be used to measure distance to a PIM source and/or PIM magnitude.

Detection of PIM Using Coordinated, High Power Transmitters

Systems and methods in accordance with embodiments of the present invention can apply techniques for stimulating the generation of PIM in objects comprising radiation-absorbent material, including vehicles having skins, coatings or outer surfaces comprising radiation-absorbent material, to thereby detect those objects.

Figure 4:
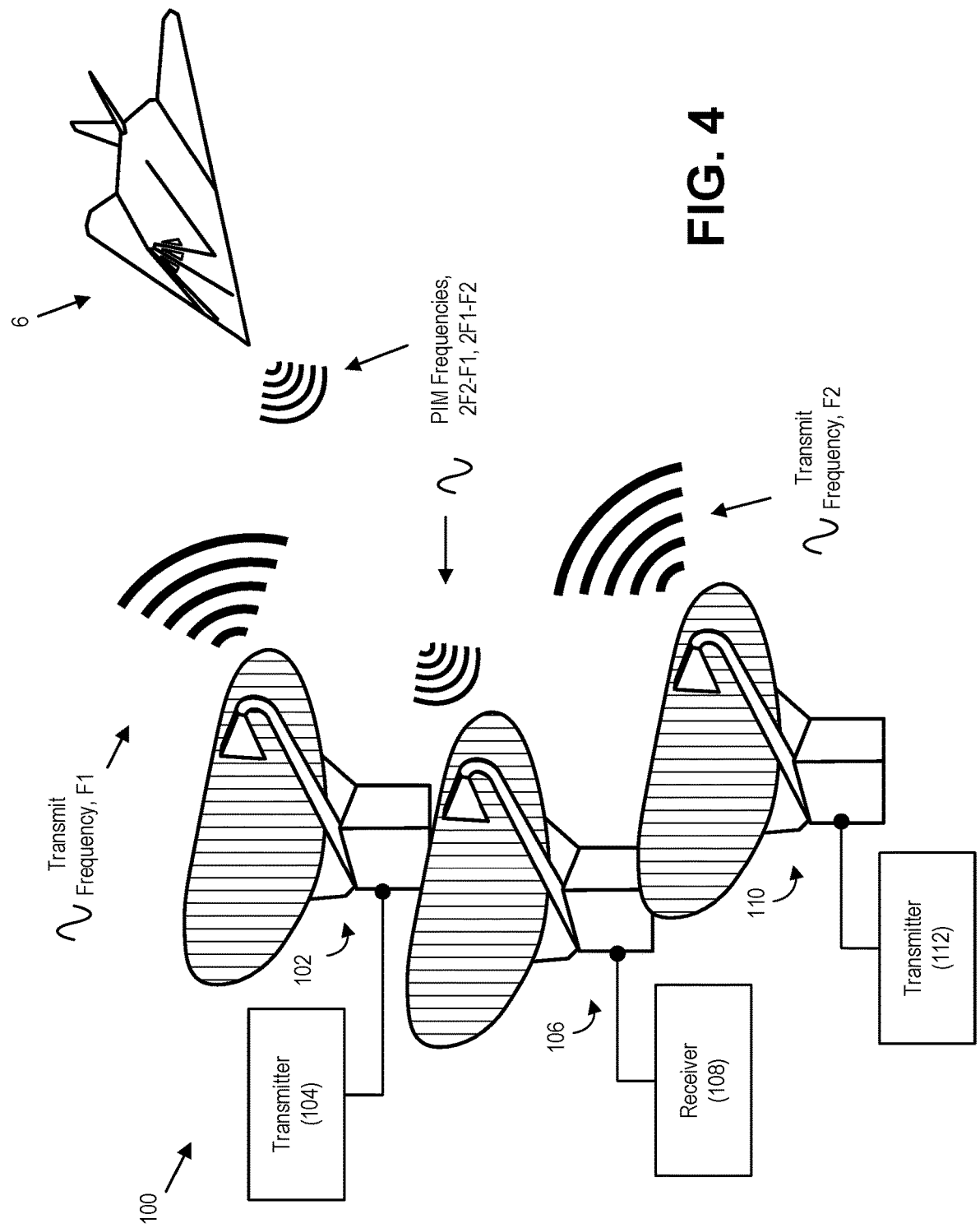
FIG. 4 is a system for detecting objects by stimulating the generation of PIM, in accordance with an embodiment.

Referring to FIG. 4, in accordance with an embodiment, a system 100 comprises a pair of transmitting antennas 102, 110 that transmit radio waves generated by transmitters 104, 112 at powers within a range of capability of a radar transmitter. Each of the transmitting antennas can be a transmitting antenna used for a radar system and modified or otherwise coordinated with the other of the transmitting antennas. The transmitting antennas can be physically connected to the same tower or, as shown, physically separated from each other, and in an embodiment, steerable.

Each of the transmitting antennas can comprise a reflector that generates a beam from a signal supplied by a feed antenna signal or a slotted waveguide for directly emitting signals, such as used in surface scan systems. The reflector can be parabolic in shape or can have some other shape. For example, the reflector can be designed to produce a beam of a particular beam shape. Embodiments of the present invention are not intended to be limited to a particular antenna design.

The system further comprises a receiving antenna 106 for receiving PIM signals reflected or reradiated in response to transmitted signals. As shown, the receiving antenna can be a separate antenna. However, in other embodiments, the receiving antenna can be one or both of the transmitting antennas. A receiver 108, such as a receiver resembling those described above with respect to FIGS. 2 and 3, can be used to measure one or more of the PIM signals and in response the system can indicate the detection of an object 6 comprising radiation-absorbent material.

In an embodiment, each of the two transmitting antennas transmits radio waves as a single tone, with the two tones having two different frequencies F1, F2. The transmit power for the radio waves can be approximately the same. The transmitting antennas are arranged to direct the radio waves transmitted from the respective antennas to a common target location. Where the transmitting antennas are steerable, the steering of the antennas is coordinated such that the radio waves continue to direct radio waves to a common, though changeable target location. As noted above, the transmitting antennas can be arranged physically close to each other, for example mounted on a common tower. Alternatively, the transmitting antennas can be physically separated by some distance, including by a relatively large distance, provided the transmitting antennas can be coordinated and arranged to transmit radio waves to a common target location.

In accordance with an embodiment, the transmitting antennas can be configured to transmit radio waves in pulses. Radio waves can be transmitted at relatively high powers, including pulses at multi-kilowatt powers. Pulsed radio waves can reduce power consumed by a detection system and isolate a receiving antenna from high power transmit signals that can desensitize a receiver to return signals, and/or enable the use of a transmitting antenna to act as a receiving antenna outside of a duty cycle. The duty cycle can be relatively low to further reduce power consumption.

The receiving antenna is likewise directed at the target location and coordinated in any movement with the transmitting antennas in order to receive PIM signals. As the radio waves at the two different frequencies F1, F2 arrive near the target location and the combined signal comes in contact with and is absorbed by a material designed to absorb radio waves and prevent reflection, such as a carbon-based material, PIM signals generated in response will be at least partially reradiated back toward the receiving antenna at harmonic frequencies, including at the third order harmonic frequencies 2F2−F1 and 2F1−F2.

In accordance with an embodiment, a distance to a detected object can be determined based on time-of-flight of the transmitted signal. The receiver of the system can be tuned to receive an intermodulation frequency signal, such as third order intermodulation product 2F2−1 or 2F1−F2. The second transmitting antenna can be synchronized to the first transmitting antenna for a simultaneous transmit pulse and the receiver can further be synchronized so that the distance can be determined based on the transmit and receive times. The received intermodulation product will arrive similarly to the traditional reflected radar system pulse.

In a further embodiment, distance can be determined using techniques similar to those described with respect to FIG. 3. In such an embodiment, the frequency of the signal transmitted by one of the two transmitters is swept while the receiver is swept over the frequencies of the intermodulation products.

Figure 5:
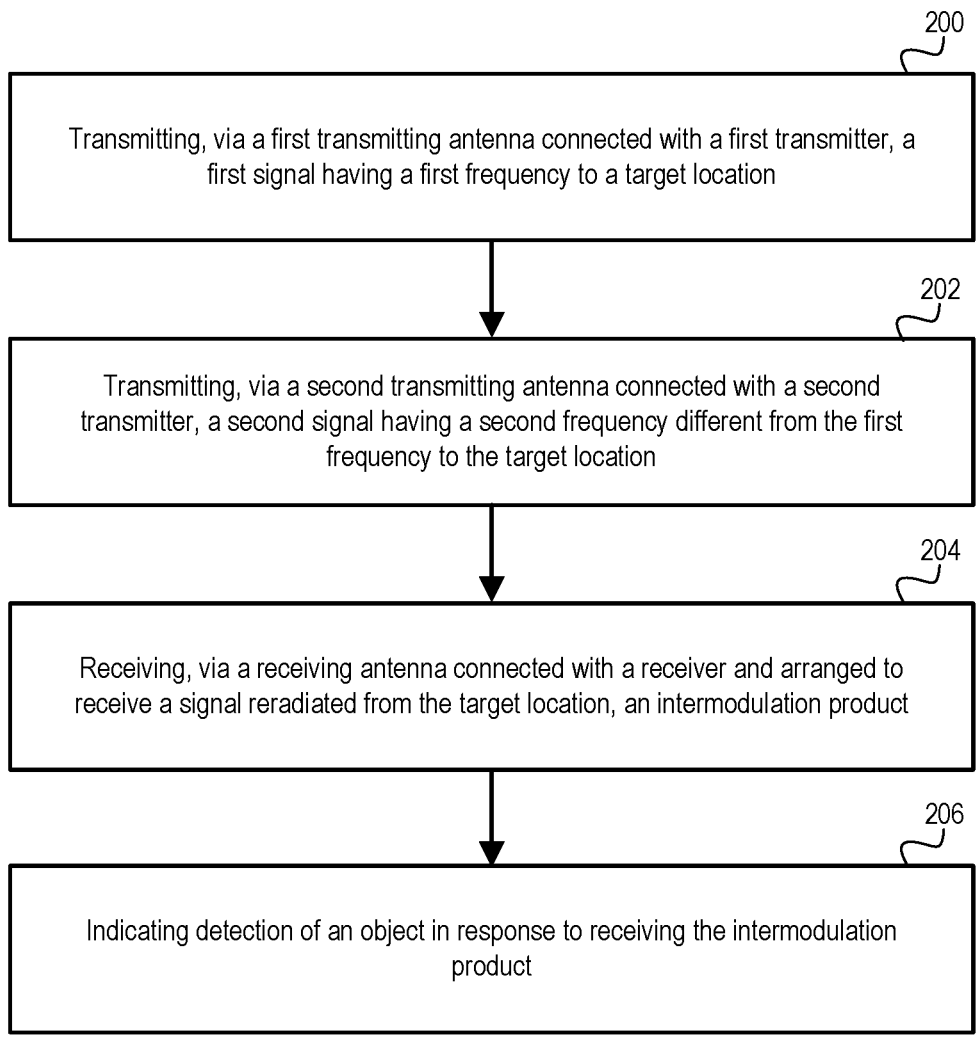
FIG. 5 is a flowchart of a method for detecting objects by stimulating the generation of PIM, in accordance with an embodiment.

FIG. 5 is a flowchart for a method for detecting objects including radiation-absorbent material, in accordance with an embodiment. A first transmitting antenna connected with a first transmitter transmits a first signal having a first frequency to a target location (Step 200). A second transmitting antenna connected with a second transmitter transmits a second signal having a second frequency different from the first frequency to the target location (Step 202). A receiving antenna connected with a receiver and arranged to receive a signal reradiated from the target location is configured to receive an intermodulation product of the first signal and the second signal having a frequency comprising a harmonic of the first signal and the second signal (Step 204). Detection of an object is indicated in response to receiving the intermodulation product (Step 206).

Embodiments of systems and methods described above are designed to comprise and make use of components including transmitting and receiving antennas and transmitters usable in radar systems, or to comprise and make use of modified components of radar systems, and further to comprise receivers and components associated with receivers of PIM measuring instruments for acquiring, downconverting and measuring PIM signals. However, in still further embodiments systems and methods can comprise a single transmitting and receiving antenna and a single transmitter that generates a test signal comprising signal components at two or more frequencies. Such embodiments would resemble measuring instruments such as shown in FIGS. 2 and 3, however such embodiments would be modified and scaled to operate at much higher power levels comparable to those used by radars systems.

In some embodiments, the present invention includes a computer program product which is a storage medium or computer readable medium (media) having instructions stored thereon/in which can be used to program a computer to perform any of the processes of the present invention. The storage medium can include, but is not limited to, any type of disk including floppy disks, optical discs, DVD, CD- ROMs, microdrive, and magneto-optical disks, ROMs, RAMS, EPROMs, EEPROMs, DRAMs, VRAMs, flash memory devices, magnetic or optical cards, nanosystems (including molecular memory ICs), or any type of media or device suitable for storing instructions and/or data.

The previous description of the preferred embodiments is provided to enable any person skilled in the art to make or use the embodiments of the present invention. While the invention has been particularly shown and described with reference to preferred embodiments thereof, it will be understood by those skilled in the art that various changes in form and details may be made therein without departing from the spirit and scope of the invention.

The invention claimed is:

1. A system for detecting an object comprising radiation-absorbent material, the system comprising:
   a first transmitter;
   a first transmitting antenna connected with the first transmitter to transmit a first signal pulse having a first frequency;
   a second transmitter;
   a second transmitting antenna connected with the second transmitter to transmit a second signal pulse having a second frequency different from the first frequency;
   wherein the first transmitting antenna and the second transmitting antenna are configured to transmit the first signal pulse and the second signal pulse to a target location;
   wherein the first signal pulse and second signal pulse are adapted to stimulate passive intermodulation in the radiation-absorbent material of the object at the target location and cause the object to emit a target signal pulse comprising an intermodulation product of the first frequency and the second frequency and having a frequency comprising a harmonic of the first frequency and the second frequency;
   a receiver tuned to receive the frequency comprising a harmonic of the first frequency and the second frequency; and
   a separate receiving antenna connected with the receiver and configured to receive the target signal pulse reradiated from the object at the target location;
   wherein the receiver is configured to receive the target signal pulse comprising an intermodulation product of the first frequency and the second frequency and having the frequency comprising a harmonic of the first frequency and the second frequency and indicate detection of the object in response to receiving the intermodulation product.

2. The system of claim 1, wherein the receiver is configured to determine a distance to the object based on elapsed time between a pulse generated by one of the first transmitter and the second transmitter and receipt of target signal pulse.

3. The system of claim 1, wherein the receiver is tuned to receive third order harmonic frequencies of the first frequency and the second frequency.

4. The system of claim 1, wherein the first transmitter and the second transmitter are configured to transmit the first signal pulse and the second signal pulse in synchronization.

5. The system of claim 4, wherein the first transmitting antenna and the second transmitting antenna are parabolic antennas.

6. The system of claim 1, wherein the receiver is tuned to receive third order harmonic frequencies of the first frequency and the second frequency.

7. A method for detecting an object comprising radiation-absorbent material, the method comprising:
   transmitting, via a first transmitting antenna connected with a first transmitter, a first signal pulse having a first frequency to a target location;
   transmitting, via a second transmitting antenna connected with a second transmitter, a second signal pulse having a second frequency different from the first frequency to the target location;
   wherein the first signal pulse and second signal pulse are adapted to stimulate passive intermodulation in the radiation-absorbent material of the object at the target location and cause the object to emit a target signal pulse comprising an intermodulation product of the first frequency and the second frequency and having a frequency comprising a harmonic of the first frequency and the second frequency;
   receiving, via a separate receiving antenna connected with a receiver tuned to receive the frequency comprising a harmonic of the first frequency and the second frequency and arranged to receive the target signal pulse reradiated from the target location, comprising the intermodulation product of the first frequency and the second frequency and having a frequency comprising a harmonic of the first frequency and the second frequency; and
   indicating detection of the object in response to receiving the intermodulation product.

8. The method of claim 7, further comprising:
   determining a distance to the object using the receiver based on elapsed time between a pulse generated by one of the first transmitter and the second transmitter and time of receipt of the target signal pulse.

9. The method of claim 7, wherein the received is tuned to receive third order harmonic frequencies of the first frequency and the second frequency.

10. The method of claim 7, further comprising:
    synchronizing the transmitting of the first signal pulse and second signal pulse.

11. The method of claim 10, wherein the first transmitting antenna and the second transmitting antenna are parabolic antennas.

12. A system for detecting an object comprising radiation-absorbent material, the system comprising:
    a first transmitter;
    a first transmitting parabolic antenna connected with the first transmitter to transmit first signal pulses having a first frequency;
    a second transmitter;
    a second transmitting parabolic antenna connected with the second transmitter to transmit second signal pulses having a second frequency different from the first frequency;
    wherein the first transmitting antenna and the second transmitting antenna are configured to synchronize and transmit the first signal pulses and the second signal pulses to a target location;
    wherein the first signal pulses and second signal pulses are adapted to stimulate passive intermodulation in the radiation-absorbent material of the object at the target location and cause the object to emit a target signal pulses comprising an intermodulation product of the first frequency and second frequency and having a frequency comprising a harmonic of the first frequency and the second frequency;
    a receiver tuned to receive the frequency comprising the harmonic of the first frequency and the second frequency; and a separate receiving antenna connected with the receiver and configured to receive the target signal pulses reradiated from the object at the target location;

wherein the receiver is configured to receive the target signal pulses comprising an intermodulation product of the first signal and the second signal having the frequency comprising a harmonic of the first frequency and the second frequency and indicate detection of the object in response to receiving the intermodulation product.

13. The system of claim 12, wherein the receiver is configured to determine a distance to the object based on elapsed time between a pulse generated by one of the first transmitter and the second transmitter and receipt of a target signal pulse.

* * * * *